(12) United States Patent
Takahara

(10) Patent No.: US 10,414,907 B2
(45) Date of Patent: Sep. 17, 2019

(54) TIRE PUNCTURE SEALANT

(71) Applicant: THE YOKOHAMA RUBBER CO., LTD., Minato-Ku, Tokyo (JP)

(72) Inventor: Hideyuki Takahara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1 day.

(21) Appl. No.: 15/563,440

(22) PCT Filed: Apr. 1, 2016

(86) PCT No.: PCT/JP2016/060964
§ 371 (c)(1),
(2) Date: Sep. 29, 2017

(87) PCT Pub. No.: WO2016/159370
PCT Pub. Date: Oct. 6, 2016

(65) Prior Publication Data
US 2018/0057666 A1    Mar. 1, 2018

(30) Foreign Application Priority Data

Apr. 2, 2015  (JP) ................ 2015-076058
Apr. 15, 2015 (JP) ................ 2015-083513

(51) Int. Cl.
| | | |
|---|---|---|
| *C08L 7/02* | (2006.01) |
| *C09K 3/10* | (2006.01) |
| *B29C 73/16* | (2006.01) |
| *B29C 73/02* | (2006.01) |
| *B29K 7/00* | (2006.01) |

(52) U.S. Cl.
CPC .............. *C08L 7/02* (2013.01); *B29C 73/163* (2013.01); *C09K 3/10* (2013.01); *B29C 73/025* (2013.01); *B29K 2007/00* (2013.01); *C08L 2201/52* (2013.01); *C08L 2205/03* (2013.01)

(58) Field of Classification Search
CPC ............ C08L 7/02; C09K 3/10; B29C 73/163
See application file for complete search history.

(56) References Cited

U.S. PATENT DOCUMENTS

| | | | |
|---|---|---|---|
| 4,501,825 A | 2/1985 | Magyar et al. | |
| 5,124,395 A * | 6/1992 | Abramowski | B29C 73/163 523/166 |
| 2010/0331448 A1 | 12/2010 | Ichikawa et al. | |
| 2014/0221527 A1 | 8/2014 | Naruse | |

FOREIGN PATENT DOCUMENTS

| | | |
|---|---|---|
| JP | S61-14277 A | 1/1986 |
| JP | 2005-120272 A | 5/2005 |
| JP | 2011-012158 A | 1/2011 |
| JP | 2013-040297 A | 2/2013 |

\* cited by examiner

*Primary Examiner* — Edward J Cain

(74) *Attorney, Agent, or Firm* — Carrier Blackman & Associates, P.C.; Joseph P. Carrier; Fulchand P. Shende

(57) ABSTRACT

A first object of the present invention is to provide a tire puncture sealing agent having excellent sealing property and injectability. A tire puncture sealing agent of a first embodiment of the present invention contains a particular amine compound, glycols, a rubber latex and/or a resin emulsion, and a surfactant. A second object of the present invention is to provide a tire puncture sealing agent having excellent retainability of generated foam and excellent sealing property even in a small liquid amount. A tire puncture sealing agent of a second embodiment of the present invention contains a particular polyether-modified silicone, glycols, a rubber latex and/or a resin emulsion, and a surfactant.

14 Claims, No Drawings

TIRE PUNCTURE SEALANT

TECHNICAL FIELD

The present invention relates to a tire puncture sealing agent.

BACKGROUND ART

In recent years, there has been an increase in instances where a puncture repair kit is introduced as standard equipment or optional equipment in an automobile.

Puncture repair kits having a combination of a tire puncture sealing agent (tire puncture sealing material) and an optional compressor and the like have been known. As actual products, compact packages that combine the tire puncture sealing agent, known as an "emergency tire puncture repairing agent" or the like, a low capacity compressor that draws power via a cigarette lighter socket, and the like are generally known.

As such a tire puncture sealing agent, for example, Patent Document 1 discloses "a tire puncture sealant containing a rubber latex, a tackifying resin emulsion, and an antifreezing agent containing a glycol, wherein a liquid phase portion, except a solid phase portion, includes a solid content of the rubber latex and a solid content of the tackifying resin emulsion contains the glycol, water and a monohydric alcohol" (claim 1).

Patent Document 1 discloses that, by forming the liquid phase portion of the puncture sealing agent by blending the glycol, water, and the monohydric alcohol, rapid increase in viscosity of the puncture sealing agent at a low temperature of approximately −30° C., thereby ensuring flowability necessary for injection into the tire (paragraph 0022).

Meanwhile, Patent Document 2 discloses "a tire puncture sealing agent containing a natural rubber latex and/or a synthetic resin emulsion, and propylene glycol, the ratio of propylene glycol to water being from 0.5 to 1.1, and the viscosity at −20° C. when a BL-type viscometer is used being from 100 to 1200 mPa·s at a revolution speed of 60 rpm" (claim 1).

Furthermore, Patent Document 3 discloses "a tire puncture sealant containing a natural rubber latex, an adhesion-imparting agent, 1,3-propanediol, and a nonionic surfactant" (claim 1).

CITATION LIST

Patent Literature

Patent Document 1: JP-A-2005-120272
Patent Document 2: JP-A-2013-040297
Patent Document 3: JP-A-2011-012158

SUMMARY OF INVENTION

Technical Problem

However, when the inventor of the present invention researched the tire puncture sealing agent described in Patent Document 1, it was found that the sealing property and the injectability through a valve of tires were not yet satisfactory.

Therefore, in light of the circumstances described above, a first object of the present invention is to provide a tire puncture sealing agent having excellent sealing property and injectability.

Meanwhile, along with demands to make puncture repair kits smaller or the like, the liquid amounts of tire puncture sealing agents need to be reduced (e.g., reduced to approximately ⅔ of the conventional amount).

When the inventor of the present invention investigated the tire puncture sealing agents disclosed in Patent Documents 2 and 3, the sealing properties are not always satisfactory when the tire puncture sealing agent is used in the liquid amount that is less than the conventional amount (liquid amount of approximately ⅔ of the conventional amount).

Examples of the method to achieve satisfactory sealing property even when the liquid amount during use is reduced include a method in which a surfactant is added to a tire puncture sealing agent. The liquid amount of the tire puncture sealing agent can be reduced since the tire puncture sealing agent foams during use by this.

However, if the foam generated by the tire puncture sealing agent is immediately broken, satisfactory sealing property may not be ensured.

Therefore, in light of the circumstances described above, a second object of the present invention is to provide a tire puncture sealing agent having excellent retainability of generated foam and excellent sealing property even in a small liquid amount.

Solution to Problem

As a result of diligent research on the first object described above, the inventor of the present invention found that sealing property and injectability become excellent by blending a particular amine compound, and thus completed the present invention.

As a result of diligent research on the second object described above, the inventor of the present invention found that, by blending a polyether-modified silicone having a particular structure, excellent retainability of generated foam is achieved and excellent sealing property is achieved even in a small liquid amount, and thus completed the present invention.

Specifically, the inventor discovered that the problem described above can be solved by the following features.

[1]
A tire puncture sealing agent containing an amine compound represented by General Formula (1), glycols, a rubber latex and/or a resin emulsion, and a surfactant.

[2]
The tire puncture sealing agent according to [1] above, where a content of the amine compound is from 1 to 50 parts by mass per 100 parts by mass total of a solid content of the rubber latex and a solid content of the resin emulsion.

[3]
The tire puncture sealing agent according to [1] or [2] above, where, in General Formula (1), $R^2$ is an alkyl group.

[4]
A tire puncture sealing agent containing a polyether-modified silicone represented by General Formula (1S), glycols, and a rubber latex and/or a resin emulsion, and a surfactant.

[5]
The tire puncture sealing agent according to [4] above, where a content of the polyether-modified silicone is from 1 to 20 parts by mass per 100 parts by mass total of a solid content of the rubber latex and a solid content of the resin emulsion.

[6]

The tire puncture sealing agent according to any one of [1] to [5] above, where the glycols are a glycol ether represented by General Formula (2).

[7]

The tire puncture sealing agent according to any one of [1] to [6] above, where a content of the surfactant is from 1 to 20 parts by mass per 100 parts by mass total of the solid content of the rubber latex and the solid content of the resin emulsion.

Advantageous Effects of Invention

As described below, the present invention can provide a tire puncture sealing agent that has excellent sealing property and excellent injectability.

Furthermore, as described below, the present invention can provide a tire puncture sealing agent that has excellent retainability of generated foam and excellent sealing properties even in a small liquid amount.

DESCRIPTION OF EMBODIMENTS

The tire puncture sealing agent of the present invention will be described below for each embodiment.

Note that, in the present invention, numerical ranges indicated using "(from) . . . to . . . " include the former number as the lower limit value and the later number as the upper limit value.

In the present invention, the expression "content of A and B" is the total content of A and B in the case where both A and B are contained, and is the content of a contained component in the case where either one of A or B is contained.

First Embodiment

The tire puncture sealing agent of a first embodiment contains an amine compound represented by General Formula (1), glycols, a rubber latex and/or a resin emulsion, and a surfactant described below.

Note that, during tire puncture repair, the tire puncture sealing agent is used by being injected through a valve (air inflation part) of the punctured tire. Therefore, from the perspective of enhancing working efficiency and the like, the tire puncture sealing agent is required to have excellent injectability through a valve of a tire.

Furthermore, after the tire puncture sealing agent is injected into a tire, the tire puncture sealing agent is agitated in the tire by driving in this state. As a result, the solid content of the tire puncture sealing agent, which infiltrates the puncture hole, is deposited to cover the puncture hole. Therefore, excellent sealing property is achieved if the tire puncture sealing agent is quickly filled in the puncture hole.

To enhance these performances described above, as a result of diligent research of the inventor of the present invention, it was found that excellent sealing property is achieved while excellent injectability through a valve of a tire is achieved by using a tire puncture sealing agent containing an amine compound represented by General Formula (1).

Second Embodiment

The tire puncture sealing agent of a second embodiment contains a polyether-modified silicone represented by General Formula (1S), glycols, a rubber latex and/or a resin emulsion, and a surfactant described below.

Note that, in tire puncture repair using a tire puncture sealing agent, the tire puncture sealing agent is injected into a punctured tire, and the pneumatic tire is used to travel in that condition. At this time, the tire puncture sealing agent is agitated within the tire, and as a result, the solid content of the tire puncture sealing agent, which infiltrates the puncture hole, is deposited to cover the puncture hole.

The inventor of the present invention found that, when a tire puncture sealing agent containing a surfactant is used, sealing property can be ensured even in a small liquid amount because the surfactant foams when the tire puncture sealing agent in the tire is stirred.

However, if the generated foam is immediately broken, a problem occurs in that satisfactory enhancement of the sealing property due to the foaming cannot be achieved.

In light of such a problem, as a result of diligent research, the inventor of the present invention found that excellent retainability of the foam generated by the tire puncture sealing agent and excellent sealing property are achieved by blending a polyether-modified silicone represented by General Formula (1S).

Each component contained in the first and second embodiments of the tire puncture sealing agents will be described below.

Amine Compound

The tire puncture sealing agent of the first embodiment contains the amine compound represented by General Formula (1) below (hereinafter, also referred to as "particular amine compound").

[Chemical Formula 1]

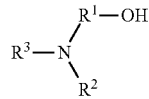

(1)

In General Formula (1) above, $R^1$ represents an alkylene group.

The alkylene group is not particularly limited and may be any of straight-chain, branched-chain, or cyclic alkylene group. The number of carbons of alkylene group is not particularly limited but is preferably from 1 to 5, and more preferably from 2 to 3.

In the present invention, when "alkylene group" is simply referred to, "alkylene group" refers to an alkylene group having no substituent (i.e., "unsubstituted alkylene group") unless otherwise noted.

In General Formula (1) above, $R^2$ represents a hydrogen atom, an alkyl group, or an alkyl group substituted with a hydroxy group or an amino group.

The alkyl group is not particularly limited and may be any of straight-chain, branched-chain, or cyclic alkyl group. The number of carbons of alkyl group is not particularly limited but is preferably from 1 to 6, and more preferably from 1 to 4.

In the present invention, when "alkyl group" is simply referred to, "alkyl group" refers to an alkyl group having no substituent (i.e., "unsubstituted alkyl group") unless otherwise noted.

In the alkyl group substituted with a hydroxy group or an amino group, the preferred alkyl group is not particularly limited and may be any of straight-chain, branched-chain, or cyclic alkyl group. The number of carbons of alkyl group substituted with a hydroxy group or an amino group is not particularly limited but is preferably from 1 to 5, and more preferably from 2 to 3.

In the alkyl group substituted with a hydroxy group or an amino group, the number of hydroxy group and amino group, i.e., the number of substituent, is not particularly limited.

$R^2$ is a hydrogen atom, an alkyl group, or an alkyl group substituted with a hydroxy group or an amino group, but preferably is an alkyl group (i.e., unsubstituted alkyl group) from the perspective of achieving even better sealing property.

In General Formula (1) above, $R^3$ represents a hydrogen atom or an alkyl group.

The alkyl group is not particularly limited and may be any of straight-chain, branched-chain, or cyclic alkyl group. The number of carbons of alkyl group is not particularly limited but is preferably from 1 to 6, and more preferably from 1 to 4.

Among the particular amine compounds described above, secondary amine compounds (i.e., only one of $R^2$ or $R^3$ in General Formula (1) above is a hydrogen atom) or tertiary amine compounds (i.e., both $R^2$ and $R^3$ in General Formula (1) above are not hydrogen atoms) are preferable, and tertiary amine compounds are more preferable.

Specific examples of the particular amine compound include N,N-dimethylethanolamine, N,N-diethylethanolamine, N,N-dibutylethanolamine, N,N-dimethylisopropanolamine, N,N-diethylisopropanolamine, N,N-dibutylisopropanolamine, N-(β-aminoethyl)ethanolamine, N-(β-aminoethyl)isopropanolamine, N-methylethanolamine, N-ethylethanolamine, N-isopropylethanolamine, N-n-butylethanolamine, N-t-butylethanolamine, N-methylisopropanolamine, N-ethylisopropanolamine, N-propylisopropanolamine, N-n-butylisopropanolamine, N-t-butylisopropanolamine, N-methyldiethanolamine, N-ethyldiethanolamine, N-isopropyldiethanolamine, N-n-butyldiethanolamine, N-t-butyldiethanolamine, N-methyldiisopropanolamine, N-ethyldiisopropanolamine, N-propyldiisopropanolamine, N-n-butyldiisopropanolamine, N-t-butyldiisopropanolamine, and the like. One type of the particular amine compound may be used alone, or two or more types of the particular amine compounds may be used in combination.

The content of the particular amine compound is preferably from 1 to 50 parts by mass, more preferably from 1 to 20 parts by mass, and even more preferably from 5 to 20 parts by mass, per 100 parts by mass total of the solid content of the rubber latex and the solid content of the resin emulsion. By setting the content of the particular amine compound to 1 part by mass or greater, sealing property and injectability become even better. Furthermore, by setting the content of the particular amine compound to 50 parts by mass or less, generation of solidification product can be reduced during the production of the tire puncture sealing agent.

Polyether-Modified Silicone

The tire puncture sealing agent of the second embodiment contains the polyether-modified silicone represented by General Formula (1S) below (hereinafter, also referred to as "particular polyether-modified silicone").

[Chemical Formula 2]

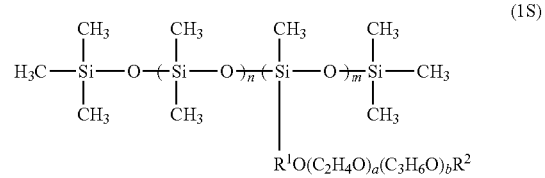

In General Formula (1S) above, $R^1$ represents an alkylene group. The alkylene group is not particularly limited and may be any of straight-chain, branched-chain, or cyclic alkylene group.

In General Formula (1S) above, $R^2$ represents an alkyl group. The alkyl group is not particularly limited and may be any of straight-chain, branched-chain, or cyclic alkyl group.

In General Formula (1S) above, n and m each independently represent an integer of 5 to 30.

A plurality of the $R^1$ moieties may be the same or different, and a plurality of the $R^2$ moieties may be the same or different.

a and b each independently represent an integer of 1 to 10.

A commercially available product can be used as the particular polyether-modified silicone, and examples thereof include SZ-1919, SH 192, SH 190, SZ-580, SRX 280 A, SZ-584, SF 2904, SZ-5740M, SZ-1142, and SZ-1959 (all of these are trade name and manufactured by Dow Corning Toray), and the like.

One type of the particular polyether-modified silicone may be used alone, or two or more types of the particular polyether-modified silicones may be used in combination.

The content of the particular polyether-modified silicone is preferably from 1 to 20 parts by mass, and more preferably from 10 to 20 parts by mass, per 100 parts by mass total of the solid content of the rubber latex and the solid content of the resin emulsion. By setting the content of the polyether-modified silicone to 1 part by mass or greater, retainability of foams and sealing property become even better. Furthermore, by setting the content of the polyether-modified silicone to 20 parts by mass or less, generation of solidification product can be reduced during the production of the tire puncture sealing agent.

Rubber Latex and/or Resin Emulsion

The tire puncture sealing agents of the first and second embodiments contain a rubber latex and/or a resin emulsion. In particular, the tire puncture sealing agent preferably contains a rubber latex and a resin emulsion. That is, a combined use of a rubber latex and a resin emulsion is preferable.

The rubber latex and the resin emulsion will be described below.

Rubber Latex

The rubber latex described above is not particularly limited, and a conventionally known rubber latex can be used.

Specific examples of the rubber latex include natural rubber latex, chloroprene latex, styrene butadiene rubber latex, acrylonitrile butadiene rubber latex, and styrene butadiene acrylic rubber latex. Among these, natural rubber latex is preferable.

In the tire puncture sealing agents of the first and second embodiments, one type of the rubber latex may be used alone, or two or more types of the rubber latexes may be used in combination.

The natural rubber latex described above is not particularly limited, and a conventionally known natural rubber latex can be used.

Specific examples of the natural rubber latex include material collected from *Hevea brasiliensis* by tapping, so-called "deproteinized natural rubber latex" which is protein-free natural rubber latex.

The content of the solid content in the rubber latex is not particularly limited; however, the content is preferably from 40 to 80 mass % relative to the total amount of the rubber latex.

Resin Emulsion

The resin emulsion is not particularly limited, and a conventionally known resin emulsion can be used. Of these, a synthetic resin emulsion is preferable.

Specific examples of the synthetic resin emulsion include urethane emulsions, acrylic emulsions, polyolefin emulsions, ethylene-vinyl acetate copolymer emulsions, polyvinyl acetate emulsions, ethylene-vinyl acetate-vinyl versatate copolymer emulsions, and polyvinyl chloride emulsions. One type of these may be used alone, or two or more types of these may be used in combination.

As the resin emulsion, ethylene-vinyl acetate copolymer emulsions or ethylene-vinyl acetate-vinyl versatate copolymer emulsions are preferred, and ethylene-vinyl acetate-vinyl versatate copolymer emulsions are more preferred.

The content of the solid content in the resin emulsion is not particularly limited; however, the content is preferably from 30 to 70 mass % relative to the total amount of the resin emulsion.

In the tire puncture sealing agents of the first and second embodiments, the total content of the rubber latex and the resin emulsion is not particularly limited; however, the content is preferably from 30 to 80 mass % relative to the total amount of the tire puncture sealing agent.

Furthermore, the total content of the solid content of the rubber latex and the solid content of the resin emulsion is not particularly limited; however, the content is preferably from 10 to 50 mass % relative to the total amount of the tire puncture sealing agent.

Glycols

The tire puncture sealing agents of the first and second embodiments contain glycols. Glycols include glycols and glycol ethers.

Examples of the glycols include ethylene glycol, propylene glycol, diethylene glycol, glycerin, and the like.

Examples of the glycol ethers include glycol ethers represented by General Formula (2) below.

One type of the glycol may be used alone, or two or more types of the glycols may be used in combination.

Among the glycols, from the perspective of achieving even better sealing property, use of glycol ether is preferred.

Among the glycols, the tire puncture sealing agents of the first and second embodiments preferably contain a glycol ether represented by General Formula (2) below from the perspective of achieving even better sealing property.

[Chemical Formula 3]

$$R_{12}\text{—O}\text{—}(CH_2CH_2O)_p\text{—}R_{11} \quad (2)$$

In Formula (2) above, $R_{11}$ represents a hydrogen atom or an alkyl group. In particular, $R_{11}$ is preferably a hydrogen atom. The alkyl group is not particularly limited. Although the alkyl group may be a straight-chain, branched-chain, or cyclic alkyl group, the alkyl group is preferably a straight-chain alkyl group.

In Formula (2) above, $R_{12}$ represents an alkyl group having from 1 to 5 carbons. Although the alkyl group may be a straight-chain, branched-chain, or cyclic alkyl group, the alkyl group is preferably a straight-chain alkyl group.

In the first and second embodiments, the number of carbons of $R_{12}$ is preferably 1 from the perspective of achieving both excellent initial foamability of the tire puncture sealing agent and durability of the foam. Furthermore, in the first embodiment, the number of carbons of $R_{12}$ is preferably from 2 to 5 from the perspective of achieving both excellent initial foamability and excellent defoamability (i.e., achieving excellent productivity and collectability of the tire puncture sealing agent).

In Formula (2) above, p represents an integer of 1 or greater. In particular, p is preferably an integer of 2 or greater, and more preferably an integer of 3 or greater.

Specific examples of the glycol ether represented by General Formula (2) above include ethylene glycol monomethyl ether, diethylene glycol monomethyl ether, triethylene glycol monomethyl ether, polyethylene glycol monomethyl ether, ethylene glycol monopropyl ether, diethylene glycol monopropyl ether, triethylene glycol monopropyl ether, polyethylene glycol monopropyl ether, ethylene glycol monobutyl ether, diethylene glycol monobutyl ether, triethylene glycol monobutyl ether, polyethylene glycol monobutyl ether, ethylene glycol dimethyl ether, diethylene glycol dimethyl ether, triethylene glycol dimethyl ether, polyethylene glycol dimethyl ether, ethylene glycol diethyl ether, diethylene glycol diethyl ether, triethylene glycol diethyl ether, polyethylene glycol diethyl ether, ethylene glycol dipropyl ether, diethylene glycol dipropyl ether, triethylene glycol dipropyl ether, polyethylene glycol dipropyl ether, ethylene glycol dibutyl ether, diethylene glycol dibutyl ether, triethylene glycol dibutyl ether, polyethylene glycol dibutyl ether, and the like.

The content of the glycols is not particularly limited in the tire puncture sealing agents of the first and second embodiments; however, the content is preferably from 10 to 500 parts by mass, more preferably from 50 to 300 parts by mass, even more preferably from 70 to 300 parts by mass, and particularly preferably from 100 to 300 parts by mass, per 100 parts by mass total of the solid content of the rubber latex and the solid content of the resin emulsion.

Surfactant

The surfactant contained in the tire puncture sealing agents of the first and second embodiments is not particularly limited, and a conventionally known surfactant can be used. Specific examples of the surfactant include nonionic surfactants, anionic surfactants, cationic surfactants, and amphoteric surfactants. One type of these surfactants may be used alone, or two or more types of these surfactants may be used in combination.

Examples of the nonionic surfactant include sorbitan fatty acid esters, polyoxyethylene sorbitan fatty acid esters, polyoxyethylene higher alcohol ethers, polyoxyethylene-propylene higher alcohol ethers, polyoxyethylene fatty acid esters, polyoxyethylene alkylphenols, polyoxyethylene alkylamines, and polyoxyethylene-polyoxypropylene block polymers.

Examples of the anionic surfactant include fatty acid salts, alkyl sulfates, alkyl ether sulfates, alkyl ester carboxylates, alkylbenzene sulfonates, straight-chain alkylbenzene sulfonates, alpha-sulfofatty acid ester salts, alkyl polyoxyethylene sulfates, alkyl phosphates, monoalkyl phosphates, naphthalene sulfonates, alpha-olefin sulfonates, alkane sulfonates, alkenyl succinates, and the like.

Examples of the cationic surfactant include alkylamine acetates, and quaternary ammonium salts, such as alkyltrimethylammonium chlorides.

Examples of the amphoteric surfactants include alkyl dimethyl betaine, and alkyl amide betaine.

The surfactant is preferably at least one type of surfactant selected from the group consisting of nonionic surfactants and anionic surfactants, more preferably anionic surfactants, and even more preferably sulfate ester salts.

The sulfate ester salt is not particularly limited; however, the sulfate ester salt is preferably an alkyl sulfate or a polyoxyethylene alkyl ether sulfate, and more preferably a compound represented by Formula (3) or (4) below.

[Chemical Formula 4]

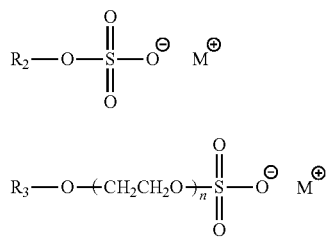

In Formulas (3) and (4) above, $R_2$ and $R_3$ each independently represent an alkyl group having from 1 to 20 carbons, $M^+$ represents a monovalent cation, and n represents an integer of 1 to 15.

In Formulas (3) and (4) above, examples of an alkyl group having from 1 to 20 carbons represented by $R_2$ and $R_3$ include a methyl group, ethyl group, propyl group, butyl group, pentyl group, hexyl group, heptyl group, octyl group, ethylhexyl group, nonyl group, decyl group, dodecyl group (lauryl group), undecyl group, hexadecyl group, octadecyl group, cyclopropylmethyl group, and trifluoroethyl group. Among these, a long-chain alkyl group having from 10 to 20 carbons is preferable. Although the alkyl group may be a straight-chain, branched-chain, or cyclic alkyl group, the alkyl group is preferably a straight-chain alkyl group.

Examples of the monovalent cation represented by $M^+$ in Formulas (3) and (4) above include monovalent metal cations (e.g. cations of alkali metals), ammonium cations, and the like. Among these, a cation represented by Formula (5) below is preferable.

[Chemical Formula 5]

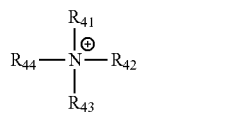

In Formula (5) above, $R_{41}$ to $R_{44}$ each independently represent a hydrogen atom, an alkyl group (e.g. alkyl group having from 1 to 5 carbons), or an alkyl group having a hydroxy group (e.g. —R—OH; note that R represents an alkylene group (preferably an alkylene group having from 1 to 5 carbons)). At least one of $R_{41}$ to $R_{44}$ is preferably an alkyl group having a hydroxy group.

Examples of the cation represented by Formula (5) above include triethanol ammonium and the like.

The content of the surfactant is preferably from 0.1 to 30 parts by mass, more preferably from 1 to 20 parts by mass, and even more preferably from 3 to 20 parts by mass, per 100 parts by mass total of the solid content of the rubber latex and the solid content of the resin emulsion.

By setting the content of the surfactant to 1 part by mass or greater, foaming of the tire puncture sealing agent is enhanced, and sealing property tends to be even better. Furthermore, by setting the content of the surfactant to 20 parts by mass or less, stability of the rubber latex becomes low and mechanical stability is enhanced, and thus sealing property tends to be even better.

Optional Component

The tire puncture sealing agents of the first and second embodiments may contain, as necessary, another component (optional component) other than the components described above. Examples of the optional component include antifreeze agents, fillers, anti-aging agents, antioxidants, pigments (dyes), plasticizers, thixotropic agents, UV absorbents, flame retardants, dispersants, dehydrating agents, and antistatic agents.

Method of Producing Tire Puncture Sealing Agent

The method of producing the tire puncture sealing agents of the first and second embodiments is not particularly limited, and examples thereof include a method by which the components described above are mixed or stirred. Furthermore, as necessary, filtration may be performed after the mixing or stirring.

EXAMPLES

Embodiments of the present invention are described in further detail below using examples. However, the present invention is not limited to such examples.

First Embodiment

Production of Tire Puncture Sealing Agent

Tire puncture sealing agents (tire puncture sealing agents of the examples and the comparative examples) were produced by mixing the components shown in Table 1 below at the proportions (part by mass) listed in the same table using a stirrer. Note that, in Table 1, numerical values shown in parentheses for the rubber latex and the resin emulsion indicate numbers of part by mass of the solid contents.

Sealing Property

The obtained tire puncture sealing agent were evaluated for sealing properties as described below.

A puncture hole (diameter: 4 mm) was made in the shoulder groove portion of the tread of a tire.

Next, the punctured tire was mounted on a drum testing machine, 300 mL of the obtained tire puncture sealing agent was injected via the tire valve, and the tire was then filled with air until the pressure inside the tire reached 150 kPa.

The tire was then subjected to intermittent driving, in which the above described tire was driven for 1 minute at a speed of 30 km/h under a load of 350 kg and then stopped. The intermittent driving was repeatedly carried out until there was no air permeation observed (until sealing was completed). The presence or absence of the air permeation was determined by visual inspection or by spraying soap water in the vicinity of the puncture hole.

The sealing properties were evaluated based on the criteria described below. The results are shown in Table 1. From the perspective of sealability, A or B is preferable, and A is more preferable.

A: Sealing was completed in 5 cycles or less of the intermittent driving.
B: Sealing was completed after 6 to 10 cycles of the intermittent driving.
C: Sealing was completed after 11 cycles or more of the intermittent driving.

Injectability 350 cc of the tire puncture sealing agent obtained as described above was heated to 70° C., and the heated tire puncture sealing agent was injected into a tire of 215/60 R16 through a valve of the tire. The time required to inject all of the 350 cc of the tire puncture sealing agent (injection time) was measured.

Evaluation of injectability was performed based on the criteria described below. The results are shown in Table 1. From the perspective of injectability, A is preferable.

A: Injection time was equal to or shorter than 25 seconds.
B: Injection time was longer than 25 seconds but 55 seconds or shorter.
C: Injection time was longer than 55 seconds, or all of the amount could not be injected.

Production Efficiency

In the production of the tire puncture sealing agent described above, after the components were mixed, the tire puncture sealing agent was immediately filtered using a metal #100 mesh to calculate the amount of generated solidification product from the total mass of the tire puncture sealing agent before and after the filtration. From the perspective of production efficiency, A is preferable.

A: Amount of generated solidification product was 0.05 mass % or less.
B: Amount of generated solidification product was greater than 0.05 mass %, or the production was difficult.

Ethyl alcohol
Surfactant: polyoxyethylene lauryl ether (trade name: Emulgen 123P, manufactured by Kao Corporation)

As shown in the evaluation results of examples in Table 1, use of the tire puncture sealing agent containing a particular amine compound exhibited both excellent sealing property and excellent injectability.

From the comparison between Example 1-2 and Example 1-4, among the particular amine compounds, Example 1-2 which used an amine compound having one hydroxy group exhibited even better sealing property than that of Example 1-4 which used an amine compound having two hydroxy groups.

From the comparison between Example 1-2 and Example 1-5, Example 1-2 which used a glycol ether as the glycols exhibited even better sealing property.

From the comparison between Example 1-2 and Examples 1-6 to 1-9, Example 1-2, 1-6, and 1-7 in which the content of the surfactant was from 1 to 20 parts by mass per 100 parts by mass total of the solid content of the rubber latex and the solid content of the resin emulsion exhibited even better sealing property.

From the comparison between Examples 1-1 to 1-3 and 1-10, Examples 1-1 to 1-3 in which the content of the particular amine compound was 50 parts by mass or less generated smaller amount of solidification product during the production of the tire puncture sealing agents and exhibited even better production efficiency.

On the other hand, Comparative Examples 1-1 to 1-5 which contained no particular amine compound exhibited at least one of insufficient sealing property and insufficient injectability.

TABLE 1

|  |  | Comparative Examples | | | | | Examples | | | | | | | | | |
|---|---|---|---|---|---|---|---|---|---|---|---|---|---|---|---|---|
|  |  | 1-1 | 1-2 | 1-3 | 1-4 | 1-5 | 1-1 | 1-2 | 1-3 | 1-4 | 1-5 | 1-6 | 1-7 | 1-8 | 1-9 | 1-10 |
| Rubber latex | | 117 (70) | 117 (70) | 117 (70) | 117 (70) | 117 (70) | 117 (70) | 117 (70) | 117 (70) | 117 (70) | 117 (70) | 117 (70) | 117 (70) | 117 (70) | 117 (70) | 117 (70) |
| Resin emulsion | | 57 (30) | 57 (30) | 57 (30) | 57 (30) | 57 (30) | 57 (30) | 57 (30) | 57 (30) | 57 (30) | 57 (30) | 57 (30) | 57 (30) | 57 (30) | 57 (30) | 57 (30) |
| Glycols | PG | 100 | 100 | | | | | | | | 100 | | | | | |
|  | MDG | | | 100 | 100 | 100 | 100 | 100 | 100 | 100 | | 100 | 100 | 100 | 100 | 100 |
| Amine compound | 2A | | | | | | 1 | 20 | 50 | | 20 | 20 | 20 | 20 | 20 | 55 |
|  | MDA | | | | | | | | | | 20 | | | | | |
|  | DEA | | | | | 20 | | | | | | | | | | |
| Ethyl alcohol | | | 10 | | 10 | | | | | | | | | | | |
| Surfactant | | 5 | 5 | 5 | 5 | 5 | 5 | 5 | 5 | 5 | 5 | 1 | 20 | 0.5 | 25 | 5 |
| Performance | Sealing property | C | C | A | A | A | A | A | A | B | B | A | A | B | B | A |
|  | Injectability | A | B | B | C | C | A | A | A | A | A | A | A | A | A | A |
|  | Production efficiency | A | B | A | B | B | A | A | A | A | A | A | A | A | A | B |

The components shown in Table 1 are as follows.
Rubber latex: natural rubber latex (Hytex HA, manufactured by Fulflex and available from Nomura Trading Co., Ltd.; solid content: 60 mass %)
Resin emulsion: ethylene-vinyl acetate-vinyl versatate copolymer emulsion (Sumikaflex 950HQ, manufactured by Sumika Chemtex Co., Ltd.; solid content: 50 mass %)
PG: propylene glycol
MDG: diethylene glycol monomethyl ether
2A: N,N-diethylethanolamine
MDA: N-methyldiethanolamine
DEA: diethylamine Second Embodiment Production of Tire Puncture Sealing Agent Tire puncture sealing agents (tire puncture sealing agents of the examples and the comparative examples) were produced by mixing the components shown in Table 2 below at the proportions (part by mass) listed in the same table using a stirrer. Note that, in Table 2, numerical values shown in parentheses for the rubber latex and the resin emulsion indicate numbers of part by mass of the solid contents.

Initial Foamability

The tire puncture sealing agent obtained as described above was placed in a plastic graduated beaker and stirred using a hand blender. After the stirring, the scale of the plastic beaker was read and the expansion ratio was calculated. The expansion ratio refers to a ratio (%) of the volume of the tire puncture sealing agent increased after the stirring relative to the volume of the tire puncture sealing agent before the stirring. Specifically, when the tire puncture sealing agent having a volume of 100 mL before stirring reached the scale of 150 mL after being foamed by the stirring, the expansion ratio is 50%.

Evaluation of initial foamability was performed based on the criteria described below. The results are shown in Table 2. From the perspective of initial foamability, A is preferable.
- A: Expansion ratio was 50% or greater.
- B: Expansion ratio was 1% or greater but less than 50%.
- C: Expansion ratio was less than 1%, or foaming did not occur.

Foam Retainability

For the tire puncture sealing agent obtained as described above, measurement was performed by a method in accordance with the Ross-Miles method (in accordance with JIS K3362). Specifically, the height of the foam generated when 200 mL of a sample liquid was dropped over 30 seconds from the height of 900 mm into a container in which 50 mL of the tire puncture sealing agent was placed was used as a reference value (100%), and the time required for the foam height to be a specific proportion (%) was measured.

Evaluation of foam retainability was performed based on the criteria described below. The results are shown in Table 2. From the perspective of foam retainability, A or B is preferable, and A is more preferable.
- A: 10 minutes or longer.
- B: 6 minutes or longer but shorter than 10 minutes.
- C: 3 minutes or longer but shorter than 6 minutes.
- D: shorter than 3 minutes, or foaming did not occur.

Sealing Property

The obtained tire puncture sealing agent were evaluated for sealing properties as described below.

A puncture hole (diameter: 4 mm) was made in the shoulder groove portion of the tread of a tire.

Next, the punctured tire was mounted on a drum testing machine, 300 mL of the obtained tire puncture sealing agent was injected via the tire valve and the tire was then filled with air until the pressure inside the tire reached 150 kPa. Note that the amount of 300 mL is approximately ⅔ of the liquid amount that is conventionally used.

The tire was then subjected to intermittent driving, in which the above described tire was driven for 1 minute at a speed of 30 km/h under a load of 350 kg and then stopped. The intermittent driving was repeatedly carried out until there was no air permeation observed (until sealing was completed). The presence or absence of the air permeation was determined by visual inspection or by spraying soap water in the vicinity of the puncture hole.

The sealing properties were evaluated based on the criteria described below. The results are shown in Table 2. From the perspective of sealability, A or B is preferable, and A is more preferable.
- A: Sealing was completed in 5 cycles or less of the intermittent driving.
- B: Sealing was completed after 6 to 10 cycles of the intermittent driving.
- C: Sealing was completed after 11 cycles or more of the intermittent driving.
- D: Sealing was not completed.

TABLE 2

|  |  | Comparative Examples | | | | | Examples | | | | | |
| --- | --- | --- | --- | --- | --- | --- | --- | --- | --- | --- | --- | --- |
|  |  | 2-1 | 2-2 | 2-3 | 2-4 | 2-5 | 2-1 | 2-2 | 2-3 | 2-4 | 2-5 | 2-6 |
| Rubber latex |  | 117 (70) | 117 (70) | 117 (70) | 117 (70) | 117 (70) | 117 (70) | 117 (70) | 117 (70) | 117 (70) | 117 (70) | 117 (70) |
| Resin emulsion |  | 57 (30) | 57 (30) | 57 (30) | 57 (30) | 57 (30) | 57 (30) | 57 (30) | 57 (30) | 57 (30) | 57 (30) | 57 (30) |
| Glycols | PG | 100 | 100 |  |  |  |  |  |  | 100 |  | 100 |
|  | MDG |  |  | 100 | 100 | 100 | 100 | 100 | 100 |  | 100 |  |
| Polyether-modified silicone | SZ-1919 |  |  |  |  |  | 1 | 10 | 20 | 10 |  |  |
|  | SH 192 |  |  |  |  |  |  |  |  |  | 10 | 20 |
| Silicone | SH 200 |  |  |  |  | 10 |  |  |  |  |  |  |
| Surfactant |  |  | 5 |  | 5 | 5 | 5 | 5 | 5 | 5 | 5 | 5 |
| Performance | Initial foamability | C | B | B | A | C | A | A | A | A | A | A |
|  | Foam retainability | D | D | C | C | C | B | A | A | B | A | B |
|  | Sealing property | C | C | C | C | C | B | A | A | B | A | A |

The components shown in Table 2 are as follows.

Rubber latex: natural rubber latex (Hytex HA, manufactured by Fulflex and available from Nomura Trading Co., Ltd.; solid content: 60 mass %)

Resin emulsion: ethylene-vinyl acetate-vinyl versatate copolymer emulsion (Sumikaflex 950HQ, manufactured by Sumika Chemtex Co., Ltd.; solid content: 50 mass %)

PG: propylene glycol

MDG: diethylene glycol monomethyl ether

SZ-1919: polyether-modified silicone represented by General Formula (1S), manufactured by Dow Corning Toray Co., Ltd.

SH 192: polyether-modified silicone represented by General Formula (1S), manufactured by Dow Corning Toray Co., Ltd.

SH 200: dimethylpolysiloxane, manufactured by Dow Corning Toray Co., Ltd.

Surfactant: polyoxyethylene lauryl ether (trade name: Emulgen 123P, manufactured by Kao Corporation)

As shown in the evaluation results of examples in Table 2, use of the tire puncture sealing agent containing a particular polyether-modified silicone exhibited excellent foam retainability and excellent sealing property.

From the comparison between Example 2-2 and Example 2-4, Example 2-2 which used a glycol ether as the glycols exhibited even better foam retainability and even better sealing property.

On the other hand, Comparative Examples 2-1 to 2-5 which contained no particular polyether-modified silicone exhibited insufficient foam retainability and insufficient sealing property.

The invention claimed is:

1. A tire puncture sealing agent comprising an amine compound represented by General Formula (1), glycols, a rubber latex, and/or a resin emulsion, and a surfactant:

[Chemical Formula 1]

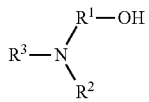

(1)

where, $R^1$ represents an alkylene group; $R^2$ represents a hydrogen atom, an alkyl group, or an alkyl group substituted with a hydroxy group or an amino group; and $R^3$ represents a hydrogen atom or an alkyl group, wherein the glycols are a glycol ether represented by General Formula (2):

[Chemical Formula 3]

(2)

where, $R_{11}$ represents a hydrogen atom or an alkyl group; $R_{12}$ represents a methyl group; and p represents an integer of 1 or greater.

2. The tire puncture sealing agent according to claim 1, wherein a content of the amine compound is from 1 to 50 parts by mass per 100 parts by mass total of a solid content of the rubber latex and a solid content of the resin emulsion.

3. The tire puncture sealing agent according to claim 1, wherein, in the General Formula (1), $R^2$ is an alkyl group.

4. A tire puncture sealing agent comprising a polyether-modified silicone represented by General Formula (1S), glycols, and a rubber latex and/or a resin emulsion, and a surfactant:

[Chemical Formula 2]

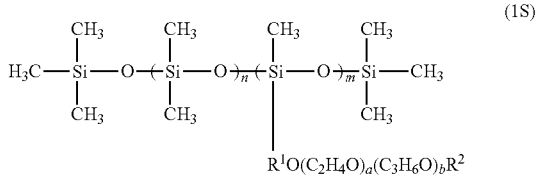

(1S)

where, $R^1$ represents an alkylene group; $R^2$ represents a hydrogen atom or an alkyl group; n and m each independently represent an integer of 5 to 30; a and b each independently represent an integer of 1 to 10; a plurality of the $R^1$ moieties may be the same or different; and a plurality of the $R^2$ moieties may be the same or different.

5. The tire puncture sealing agent according to claim 4, wherein a content of the polyether-modified silicone is from 1 to 20 parts by mass per 100 parts by mass total of a solid content of the rubber latex and a solid content of the resin emulsion.

6. The tire puncture sealing agent according to claim 1, wherein a content of the surfactant is from 1 to 20 parts by mass per 100 parts by mass total of the solid content of the rubber latex and the solid content of the resin emulsion.

7. The tire puncture sealing agent according to claim 2, wherein, in the General Formula (1), $R^2$ is an alkyl group.

8. The tire puncture sealing agent according to claim 4, wherein the glycols are a glycol ether represented by General Formula (2):

[Chemical Formula 6]

(2)

where, $R_{11}$ represents a hydrogen atom or an alkyl group; $R_{12}$ represents an alkyl group having from 1 to 5 carbons; and p represents an integer of 1 or greater.

9. The tire puncture sealing agent according to claim 5, wherein the glycols are a glycol ether represented by General Formula (2):

[Chemical Formula 7]

(2)

where, $R_{11}$ represents a hydrogen atom or an alkyl group; $R_{12}$ represents an alkyl group having from 1 to 5 carbons; and p represents an integer of 1 or greater.

10. The tire puncture sealing agent according to claim 2, wherein a content of the surfactant is from 1 to 20 parts by mass per 100 parts by mass total of the solid content of the rubber latex and the solid content of the resin emulsion.

11. The tire puncture sealing agent according to claim 3, wherein a content of the surfactant is from 1 to 20 parts by mass per 100 parts by mass total of the solid content of the rubber latex and the solid content of the resin emulsion.

12. The tire puncture sealing agent according to claim 4, wherein a content of the surfactant is from 1 to 20 parts by mass per 100 parts by mass total of the solid content of the rubber latex and the solid content of the resin emulsion.

13. The tire puncture sealing agent according to claim 5, wherein a content of the surfactant is from 1 to 20 parts by mass per 100 parts by mass total of the solid content of the rubber latex and the solid content of the resin emulsion.

14. The tire puncture sealing agent according to claim 7, wherein a content of the surfactant is from 1 to 20 parts by mass per 100 parts by mass total of the solid content of the rubber latex and the solid content of the resin emulsion.

* * * * *